H. A. MASON.
ATTACHMENT FOR BALING PRESSES.
APPLICATION FILED JULY 14, 1915.
1,203,381.
Patented Oct. 31, 1916.
2 SHEETS—SHEET 1.
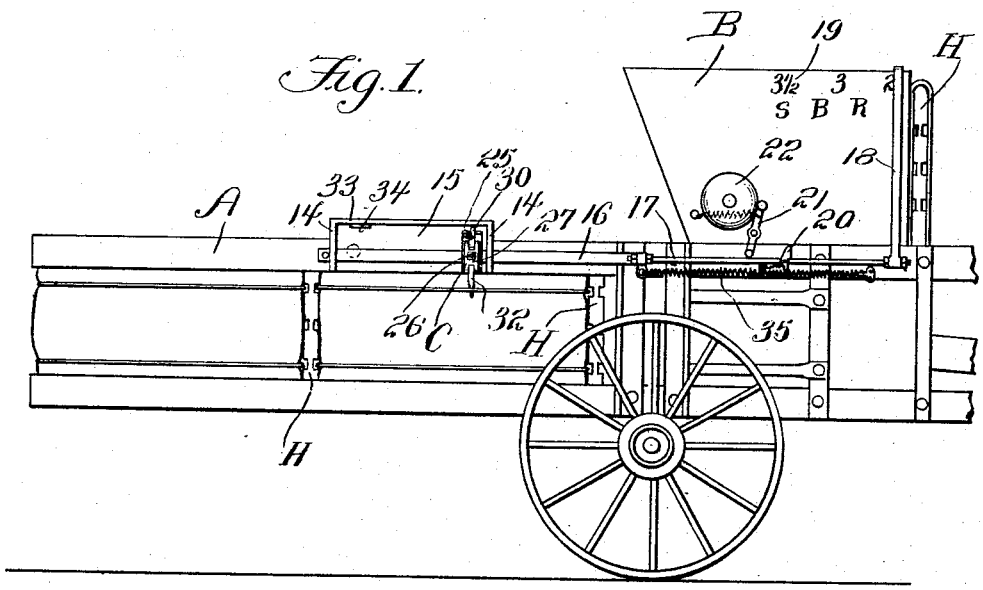
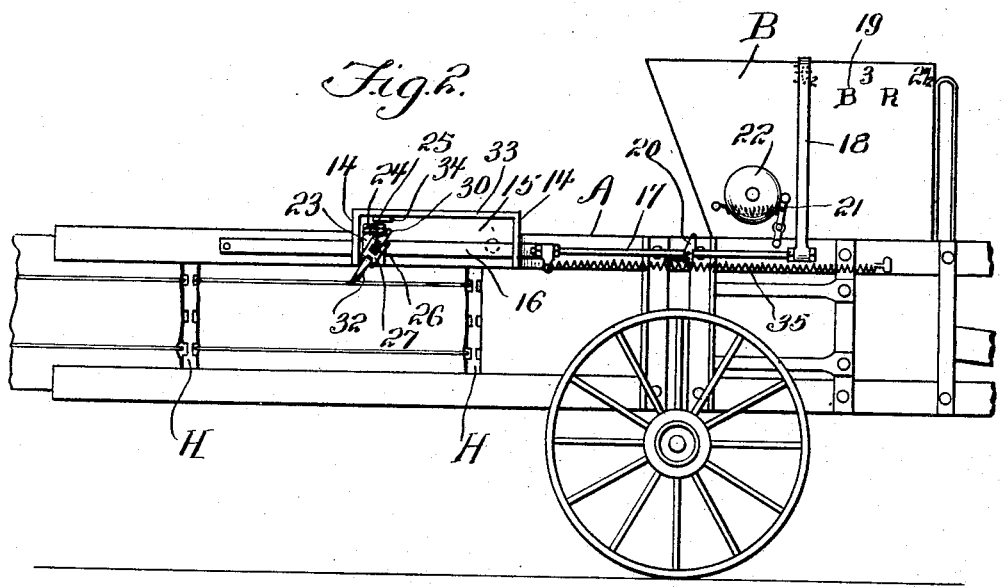

H. A. MASON.
ATTACHMENT FOR BALING PRESSES.
APPLICATION FILED JULY 14, 1915.
1,203,381. Patented Oct. 31, 1916.
2 SHEETS—SHEET 2.
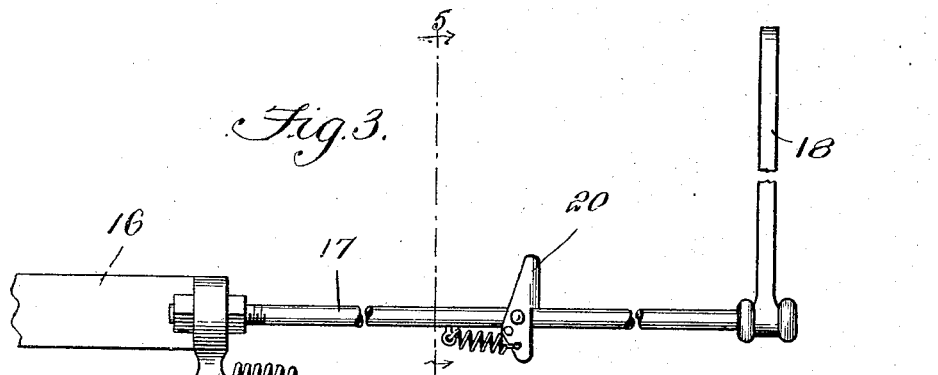
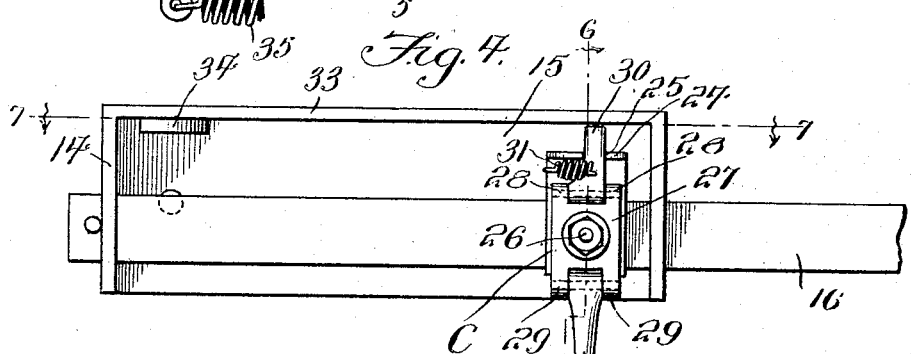
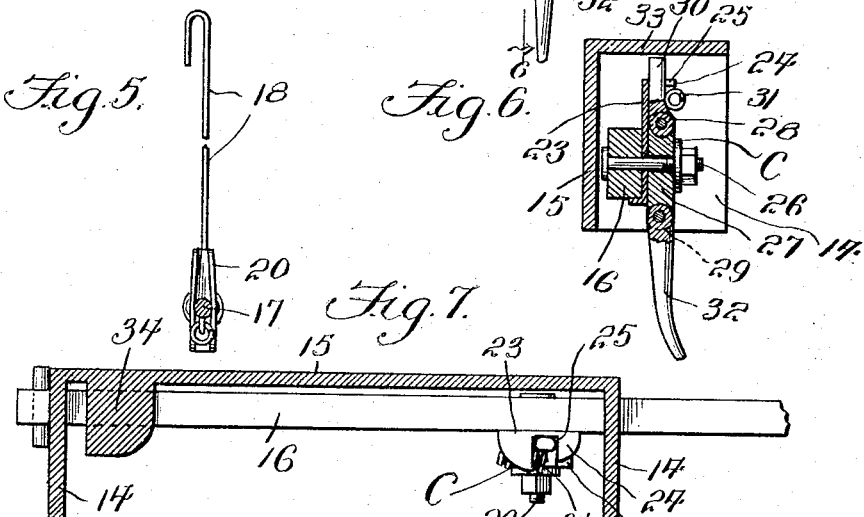
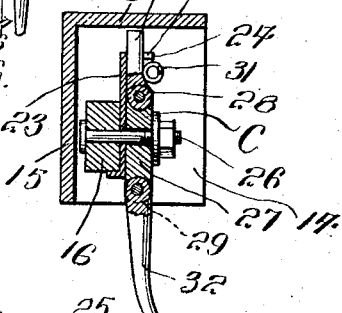
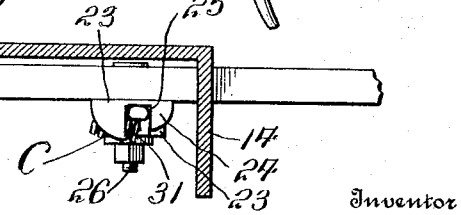
Witnesses
J. L. Wright
Inventor
H. A. Mason
By Victor J. Evans
Attorney

UNITED STATES PATENT OFFICE.

HENRY A. MASON, OF LAWNDALE, ILLINOIS.

ATTACHMENT FOR BALING-PRESSES.

1,203,381. Specification of Letters Patent. Patented Oct. 31, 1916.

Application filed July 14, 1915. Serial No. 39,929.

*To all whom it may concern:*

Be it known that I, HENRY A. MASON, a citizen of the United States, residing at Lawndale, in the county of Logan and State of Illinois, have invented new and useful Improvements in Attachments for Baling-Presses, of which the following is a specification.

This invention relates to attachments for baling presses, and it has particular reference to attachments or signal devices whereby the operator will be notified when the bale which is in process of formation is of a predetermined length in order that he may know precisely when to insert a head block or separating block between the bales.

The invention has for its object to produce a simple and improved traveling indicator the position of which will indicate to the operator the precise length of the bale which is approaching completion.

A further object of the invention is to produce a device of the class described having a simple and improved trip including an arm adapted to be connected with a complete bale by means of one of the tying wires and to travel a certain distance with said bale, in connection with trip mechanism constructed to enable the said arm to be disconnected from the completed bale.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a side elevation showing a portion of a conventional baling press to which the invention has been applied and illustrating the position of the parts before the indicator starts on its outward course. Fig. 2 is a similar view showing the indicator mechanism at the outward limit of its movement and ready to be restored to its initial position. Fig. 3 is a detail view in side elevation and on a larger scale of the inner end portion of the indicating mechanism. Fig. 4 is a similar view of the outer end portion of the indicator mechanism. Fig. 5 is a transverse sectional view taken on the line 5—5 in Fig. 3. Fig. 6 is a transverse sectional view taken on the line 6—6 in Fig. 4. Fig. 7 is a horizontal sectional view taken on the line 7—7 in Fig. 4.

Corresponding parts in the several figures are denoted by like characters of reference.

The improved device includes a casing or housing 15 which is adapted to be connected in any convenient manner with the baling chamber A of a conventional baling press. A bar 16 is slidably supported in the end walls 14 of the housing, said bar carrying at one end an extension rod 17 that extends in the direction of the hopper B of the press. The rod 17 carries an indicator 18 pointing toward a row of figures or indicia 19 on the hopper which when the device is in operation will indicate to the operator who feeds the press the length of the bale that is in process of formation. The extension rod 17 carries a spring actuated latch or trip member 20 which shortly after the device starts in operation will actuate a striking lever 21 to sound a bell or gong 22.

The bar or slide 16 carries between the end walls 14 of the housing a trip member C, the same comprising a base plate 23 which is fixed on the slide and which is provided at its upper end with a beveled flange 24 having a notch 25. A bolt or pivot member 26 which extends through the slide 16 and the base plate 23 at right angles thereto supports a pivoted body 27 provided at its upper end with ears 28 and at its lower end with ears 29. Between the ears 28 is mounted a pivotally supported latch 30 which swings about an axis substantially at right angles to the axis of the pivot member 26 so that said latch will be normally held in engagement with the notch 25 of the beveled flange 24 by the action of a spring 31, one end of which is connected with the latch 30 and the other end with the base plate 23, said spring being effective to rock the body member 27 about the axis of the bolt 26, thereby throwing the latch 30 into the notch 25 where it is normally held by the tension of the spring. Pivotally supported between the ears 29 is a downwardly extending arm 32, the lower end of which is free to swing in the direction of the baling chamber.

Secured on the under face of the top member 33 of the housing or casing is a cam member 34, said top member being positioned near the rearward end of the housing so that when the slide 16 approaches the limit of its movement in a rearward direction, the said cam member will engage the latch 30 with the effect of disengaging said latch from the notch 25, thus permitting the body member 27 to rock about the axis of the bolt 26. A spring 35 serves to retract the bar or slide 16 in a forward direction.

In the conventional modern baling press, when in operation, the press box usually contains one finished bale which is being ejected, an incomplete bale which is in process of formation, and an intermediate bale which is ready for the application of the baling wires, the several bales being supported by the customary head blocks which in the drawings are indicated by H. The operator or attendant whose duty it is to apply the wires will obviously watch for the appearance of the head block or division block at the front end of the intermediate bale in order that the wires may be applied as soon as said block makes its appearance through the slots or openings in the sides of the press box. When this division block makes its appearance it is obvious that the bale in process of formation will have attained a certain predetermined length. When the block makes its appearance through the side of the press, the operator instantly applies the top wire in such a way as to include the arm 32 between the wire and the bale, thus establishing a connection between the bale and the slide 16, causing the latter to move in a rearward direction with the bale. When this rearward movement begins the bale in process of formation will be presumed to have attained a length equal to that indicated by the first figure on the hopper toward which the indicator 18 has been pointed while stationary. As the slide 16 starts in a rearward direction along with the bale with which it is connected, the latch or trigger 20 will presently encounter the striking lever 21, thereby sounding the bell and notifying the operator who is feeding the press. As the indicator 18 moves along it will now in connection with the indicia 19 indicate the exact length of the bale which is in process of formation, and when the desired length has been attained the operator drops a partition block into the press, after which the feeding is continued to begin the formation of a new bale.

In the meantime, the slide 16 moves along until the latch 30 encounters the cam member 34, whereby it is disengaged from the notch 25. The body member 27 will now be free to rock about its axis, and the rearward movement of the bale with which the arm 32 is connected will now produce a tilting movement of the body 27 and arm 32 until the latter swings clear of the bale wire, when the slide 16 and related parts will be instantly retracted by the action of the spring 35 to remain stationary until another bale is being tied, thereby establishing connection between such bale and the slide through the medium of the arm 32.

It will be readily seen that by the use of this simple and improved device, the operator who is in charge of feeding the press will be enabled to make bales of an exact predetermined length, although such length is not necessarily constant, but may be varied, the length being governed by the point at which the partition block is placed in the press. The attention of the operator need not be constantly directed to the indicating mechanism, but he will be notified shortly after the starting in a rearward direction of the slide 16, giving him ample time to notice when the bale in process of formation has attained the desired length, when a partition block is to be inserted.

Having thus described the invention, what is claimed as new, is:—

1. In a device of the class described, a slide carrying an indicator, and means for connecting said slide with a bale contained in the baling chamber of a press, said means including a pivotally supported body, a latch whereby said body is held against pivotal movement, and an arm pivotally connected with the body.

2. In a device of the class described, a slide carrying an indicator, and means for connecting said slide with a bale contained in the baling chamber of a press, said means including a pivotally supported body, a latch whereby said body is held against pivotal movement, and an arm pivotally connected with the body; in combination with a cam member adapted to disengage the latch to permit the body to rock on its pivotal support.

3. In a device of the class described, a housing, a spring retracted slide carrying an indicator, a body member pivoted on the face of the slide, said body member carrying a pivoted latch and a pivoted arm, both of which are adapted to rock in a plane substantially at right angles to the plane in which the body member may rock, a base plate having a flange provided with a notch engaged by the latch, a spring connecting the latch with the base plate and tending to rock the body member about the axis of its pivotal support and to place the latch in engagement with the notch, and a cam member supported in the path of the pivoted spring actuated latch member.

4. In a device of the class described, the combination with a baling press having indicia and a bell mounted on said press and having a striking lever, of a longitudinally movable spring retracted slide having an indicator pointing toward the indicia, a spring actuated trigger on the slide adapted to engage the striking lever, means for establishing connection between the slide and a bale within the baling chamber of the press, and means for interrupting such connection at a predetermined point.

In testimony whereof I affix my signature in presence of two witnesses.

HENRY A. MASON.

Witnesses:
P. E. KUHL,
E. H. SANFORD.

Copies of this patent may be obtained for five cents each, by addressing the "Commissioner of Patents, Washington, D. C."